United States Patent [19]

Wong

[11] Patent Number: 5,775,394

[45] Date of Patent: Jul. 7, 1998

[54] PUCKER FREE SLEEVE PLACKET GARMENT SEAM AND METHOD FOR PRODUCTION

[75] Inventor: John Wong, Montreal, Canada

[73] Assignee: Tal Apparel, Ltd., Kowloon, Hong Kong

[21] Appl. No.: 782,003

[22] Filed: Jan. 6, 1997

Related U.S. Application Data

[63] Continuation-in-part of Ser. No. 613,656, Mar. 11, 1996, Pat. No. 5,590,615, which is a continuation of Ser. No. 245,122, May 17, 1994, Pat. No. 5,568,779.

[51] Int. Cl.$^6$ .............................. D05B 1/18; A41D 27/10; B32B 7/08; B32B 7/12
[52] U.S. Cl. .............................. 112/441; 112/475.09; 2/123; 2/275; 156/93
[58] Field of Search .............................. 112/441, 475.09, 112/403, 417, 418, 402, 440, 475.01, 475.06, 420, 429, 416; 2/125, 275, 129, 243.1, 272, DIG. 5, 118, 268, 121, 122, 123; 156/91, 92, 93, 275.5; 428/102, 375, 418, 172, 186, 354; 223/2, 4; 28/153

[56] References Cited

U.S. PATENT DOCUMENTS

| | | |
|---|---|---|
| 1,706,461 | 3/1929 | Oathout . |
| 1,784,942 | 12/1930 | Miller . |
| 2,095,886 | 10/1937 | Neuman ................................ 2/275 X |
| 2,120,458 | 6/1938 | Bodle . |
| 2,264,224 | 11/1941 | Swan . |
| 2,266,953 | 12/1941 | Blue . |
| 2,372,632 | 3/1945 | Webb ................................ 2/275 X |
| 2,719,803 | 10/1955 | Nottebohm . |
| 2,731,788 | 1/1956 | Donaldson, Jr. . |
| 2,925,642 | 2/1960 | Pfeffer, Jr. . |
| 2,937,380 | 5/1960 | Reese . |
| 2,988,457 | 6/1961 | Gatcomb . |
| 3,094,705 | 6/1963 | Reid et al. . |
| 3,333,280 | 8/1967 | Hynek et al. ................... 112/475.09 X |
| 3,399,642 | 9/1968 | Etchison et al. . |
| 3,453,662 | 7/1969 | Weiss . |
| 4,077,066 | 3/1978 | Weiss . |
| 4,549,916 | 10/1985 | Off et al. . |
| 4,561,128 | 12/1985 | Zimmerman . |
| 4,803,109 | 2/1989 | Saniscalchi . |
| 5,003,902 | 4/1991 | Benstock et al. . |
| 5,063,101 | 11/1991 | Grynaeus et al. . |
| 5,568,779 | 10/1996 | Wong . |
| 5,590,615 | 1/1997 | Wong . |

FOREIGN PATENT DOCUMENTS

1104802   12/1958   Germany .

Primary Examiner—Ismael Izaguirre
Attorney, Agent, or Firm—Bradford E. Kile; Karan Singh

[57] ABSTRACT

A pucker free garment seam providing a garment with a tailored and wrinkle free appearance. The pucker free seam and method for production utilizes a bonding strip which contains at least a thermal adhesive component which is inserted between first and second garment components along the seam and a sewing thread is used to bind the components together into a seam. A sufficient amount of heat and pressure is applied to the seam which causes the adhesive of the bonding strip to flow onto the surfaces of the garment components thereby creating a compressed seam and permanently bonding the first and second garment components together along the seam to eliminate puckering associated with shrinkage of the sewing thread.

58 Claims, 2 Drawing Sheets

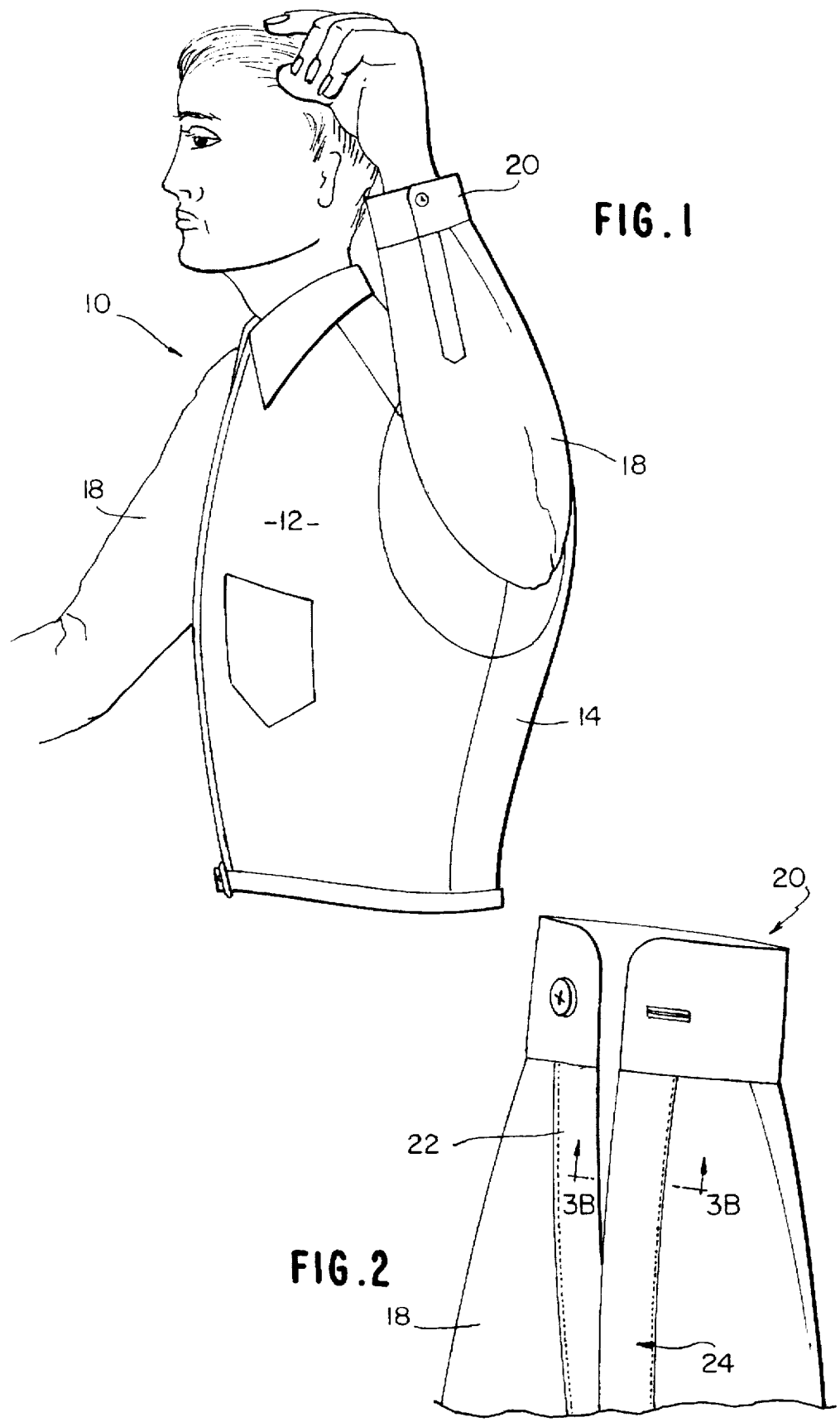

PUCKER FREE SLEEVE PLACKET GARMENT SEAM AND METHOD FOR PRODUCTION

RELATED INVENTION

This application is a continuation-in-part of applicant's prior copending application Ser. No. 613,656 filed Mar. 11, 1996 entitled "Pucker Free Garment Seam and Method of Manufacture" now U.S. Pat. No. 5,590,615 which is a continuation of applicant's prior application Ser. No. 245, 122 filed May 17, 1994 entitled "Pucker Free Garment Seam and Method of Manufacture" now U.S. Pat. No. 5,568,779 all of common assignment herewith.

BACKGROUND OF THE INVENTION

The present invention relates to a pucker free garment seam and method for production. More specifically, the invention is directed to an improved sleeve placket garment seam and method for production which facilely eliminates a tendency of the seam to bunch or pucker around a sleeve placket area and other similar areas following conventional laundering procedures.

A puckering phenomenon at seam lines has long plagued the garment industry. Seam pucker is typically caused by thread shrinkage which occurs during laundering of a garment. In particular, after a garment is purchased by a garment consumer it is subjected to laundering cycles as the shirt is worn and becomes soiled. During these laundering and drying cycles the sewing thread typically undergoes longitudinal shrinkage. It is this shrinkage, at a rate greater than the surrounding shirt material that creates puckering at a seam joining two panels of fabric. In this, the sewing thread contracts upon being laundered and pulls on the opposing garment components at the garment seam which in turn causes the garment components to buckle and thereby create wrinkles along the garment seam. This effect is noticeable in the sleeve placket seams of a dress shirt. Accordingly, it would be highly desirable to provide a method for production and a shirt garment which would be free of pucker phenomenon in the sleeve placket region of the shirt. Moreover, it would be desirable to maintain a placket seam of a shirt, or the like, which would be smooth and pucker free even after multiple laundering operations.

Several attempts have been made to reduce seam pucker in dress shirts. One attempt utilizes an interlining having a thermoplastic component in the interlining matrix. During the manufacture process the seam is ironed which reduces the cross-sectional thickness of the seam along the stitch line. The reduced thickness allows for slack in the sewing thread such that during subsequent laundering the sewing thread is permitted to shrink an amount equal to the slack. This technique is not entirely effective in reducing seam pucker. First, the garment components sewn together at the seam are allowed to pull apart between outer stitches of the seam which results in buckling of the garment fabric. Second, the thread which is compressed in the interlining matrix becomes bound within the matrix thus shrinkage of the thread still results in at least a degree of seam pucker. Third, manufacturing an interlining results in an overall increase in garment manufacturing cost. This cost is compounded if the interlining is a composite interlining.

Another prior attempt at reducing seam pucker utilizes special garment material. Specifically, the garment components sewn together at the seam are manufactured from material which stretches during the sewing process and which relaxes after the sewing process is complete. This relaxation provides for slack in the sewing thread. This attempt is also ineffective at reducing seam pucker. First, as before, the garment components sewn together at the seam are allowed to pull apart between outer stitches of the seam which results in buckling of the garment fabric. Second, only garments manufactured from certain stretch materials may be utilized to manufacture the garments. The disadvantages associated with this are clear.

Still other prior art attempts alter the nature of the sewing thread used in the sewing process. For example, one such attempt utilizes a composite sewing thread whereby one component of the thread is water soluble. During the laundering process the water soluble component dissolves thereby creating slack in the sewing thread which compensates for thread shrinkage. First, as before, the garment components sewn together at the seam are allowed to pull apart between outer stitches of the seam which results in buckling of the garment fabric. Second, the high cost of manufacturing a sewing thread altered in this way increases the overall garment cost. Third, thread strength can be compromised by such composite design. Last, commercial sewing machines are not well adapted to utilize altered thread. Other prior art attempts which alter the nature of the sewing thread are not believed to be fully effective for the same noted reasons.

The difficulties and limitations suggested in the preceding are not intended to be exhaustive, but rather are among many which demonstrate that although significant attention has been devoted to reducing pucker in garment seams, puckerless garment seams and method for production appearing in the past will admit to worthwhile improvement.

OBJECTS AND BRIEF SUMMARY OF THE INVENTION

It is therefore a general object of the invention to provide a novel, smooth garment seam at a sleeve placket region of a shirt and method for production which will obviate or minimize difficulties of the type previously described.

It is a specific object of the invention to provide a smooth garment seam and method for production which will eliminate seam pucker at a sleeve placket region of a shirt.

It is another object of the invention to provide a smooth garment seam and method for production which may be used in a variety of garments to provide a pucker free tailored appearance.

It is still another object of the invention to provide a smooth garment seam and method for production for advantageous use in a sleeve placket seam of a dress shirt.

It is yet another object of the invention to provide a smooth sleeve placket garment seam and method for production which provides for a cost effective solution to seam pucker and does not involve significant modification of existing production apparatus.

BRIEF SUMMARY OF A PREFERRED EMBODIMENT OF THE INVENTION

A preferred embodiment of the invention which is intended to accomplish the foregoing objects includes a bonding strip which contains at least a thermal adhesive component which is inserted between fabric surfaces along a seam line of a garment. The seam is subjected to a sufficient amount of heat and pressure to cause the adhesive of the bonding strip to flow over the surfaces of opposing fabrics thereby creating a compressed seam and permanently bonding the fabrics together along the seam to eliminate puckering associated with sewing thread shrinkage.

DRAWINGS

Other objects and advantages of the present invention will become apparent from the following detailed description of a preferred embodiment thereof taken in conjunction with the accompanying drawings, wherein:

FIG. 1 is a pictorial view showing a human figure wearing a shirt having a seam produced in accordance with the present invention;

FIG. 2 is a segmental view, more particularly, showing the placket seam of the dress shirt depicted in FIG. 1 which sleeve placket seam has been produced in accordance with the present invention.

DETAILED DESCRIPTION

Figure 3A:
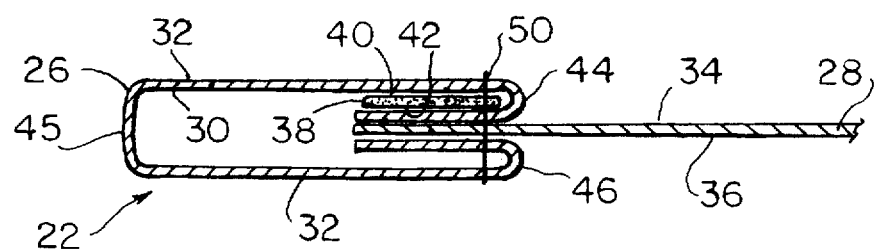
FIGS. 3a and 3b depict cross-sectional views of a method for producing and a dress shirt seam in accordance with a preferred embodiment of the present invention.

Referring now to the drawings and particularly to FIG. 1, there is shown a human male figure wearing a dress shirt 10 having front panels 12, back panels 14, sleeves 18, a cuff 20 at the distal end of each sleeve and a sleeve placket 22 produced in accordance with the present invention. FIG. 2 shows a more detailed view of the sleeve placket 22 as located on a shirt sleeve 14. The shirt sleeve placket 22 is connected to the sleeve 18 along a sleeve placket seam 24 in accordance with a preferred embodiment of the invention. The phenomenon of seam pucker is troubling in sleeve placket seams 24 because of their location and their attachment to the sleeve cuff 20 which is an easily visible location of a dress shirt.

Figure 3B:
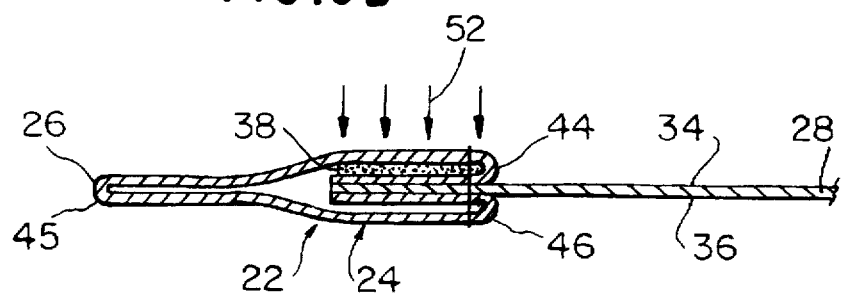

Turning now to FIGS. 3a and 3b, the progressive production steps for producing a seam 24 of the present invention is disclosed. FIG. 3b shows a cross-sectional detail view of a completed sleeve placket seam 24 produced in accordance with the present invention.

Referring to FIG. 3a there is shown a first garment component 26 and a second garment component 28. In the sleeve placket 22 embodiment of the present invention, the first garment component 26 forms a dress shirt sleeve placket 22 and the second garment component 28 comprises a portion of the shirt sleeve 18. The first garment component 26 has a first or inner surface 30 and a second or outer surface 32. The second garment component 28 has a first or outer surface 34 and a second or inner surface 36.

A bonding strip forms an integral part of the present invention. The bonding strip 38 has a first or outer surface 40 and a second or inner surface 42. In the preferred embodiment of the invention and as shown in the figures, the bonding strip 38 is composed of an adhesive web consisting entirely of an adhesive material. The adhesive material is preferably composed of a polyamide, polyester, or an olefinic material such as a low density polyethylene. Other thermoplastic materials such as polyurethane and ethylene vinylacetate copolymer can also be used. The aforementioned adhesives are preferable because they all have a low melting point in the range of 60-160 degrees celsius. In the preferred embodiment, the adhesive web is produced from a plurality of filaments having a diameter ranging between 20-80 microns. Furthermore, the adhesive web of the present invention has a density of approximately 10-100 grams per square meter. Alternatively, a more solid structured net adhesive may be used having a density preferably in a range of 8-80 grams per square meter. Other types of adhesives may also be used in accordance with the concept of the present invention provided they suitably bond to cloth surfaces of a garment and will not degrade in water during a laundering operation.

The bonding strip 38; first garment component 26, form a sleeve placket 22 of a shirt sleeve 18; and second garment component 28, form a sleeve 18 of a shirt 10, are positioned such that the second or lower surface 36 of the second garment component 28 abuts a second or outer surface 32 of the first garment component 26 and the first inner surface 30 of the first garment component 26 is wrapped around and abuts against the first and second surfaces of the bonding strip 38. As shown in FIG. 3a, the first garment component 26 is a generally "U-shaped" member in cross section with reversely folded end portions. The second garment component 28 extends between a first reversely folded edge 44 of the first garment component 26 and a second reversely folded edge 46 of the first garment component. The bonding strip 38 is intimately received within the first reversely folded edge 44 of the first garment component. In this position, the first or inner surface of the first garment component extends about and enrobes the first surface 40 and the second surface 42 of the bonding strip 38. The first garment component 26 is reverse folded a second time at 45 such that the first surface 30 of the first garment component 26 abuts itself. The first garment component 26 is reverse folded a third time at 46 such that a portion of the second surface 32 of the first garment component 26 abuts the second surface 36 of the second garment component 28 along the seam 24, and a portion of the first surface 30 of the first garment component 26 abuts itself along the seam. As also shown in FIG. 3a, a stitch 50 is sewn along the seam line defined by the folded portions 44 and 46 of the first garment component 26, the bonding strip 38, and the second garment component 28. This stitch 50 extends along the placket seam and traverses the reverse folded portions 44 and 46 of the first garment component 26, the bonding strip 38 and the second garment component 28. In the embodiments of FIGS. 3a through 3b this stitch 42 is a needle set sleeve stitch and is the only stitch utilized at the placket seam. In addition, however, a second stitch could be employed if necessary to provide a more rugged closing. Moreover, it is envisioned that a set stitch could be utilized to initially join the three components together prior to reversely folding of the first garment component.

The production of the improved seam 24 of the present invention is completed with the application of heat and pressure to the seam 24. As schematically shown in FIG. 3b, this can be accomplished with an ironing process. For improved control and quality this process is usually carried out on a heated press schematically depicted by arrows 52 with a temperature from 60 to 160 degrees celsius for 5 to 10 seconds followed with a vacuum step to cool and set the adhesive. The applied heat and pressure causes adhesive of the bonding strip 38 to melt and flow onto the first surface or inner surface 30 of the first component 26. That is, the adhesive flows onto the inner surface 30 of the first garment component 26 along a first or upper surface 40 of the bonding strip 38 and concomitantly along a second or lower surface 42 of the bonding strip. Significantly, during the ironing/pressing process 52, the flowing adhesive becomes interposed in the interstices of the garment fabric of the first garment component 26. This is advantageous because it creates a very strong bond between the fabric surfaces along the seam 24 and the thread of the stitch 50. It is this bond that prevents seam pucker during subsequent laundering operations. In particular, because the fabric surfaces are bonded together along the seam 24, they cannot pull apart during laundering. Therefore, buckling of the seam fabric is prevented. This is a significant advantage over the prior art seams which permit the fabrics to become separated during subsequent laundering which in turn results in seam pucker. The ironing/pressing process 52 also compresses the seam as to reduce the seam thickness.

The first reverse folded portion 44 of the first garment component 26 is the visible portion of the sleeve placket 22. The sleeve placket 22 is also connected to the sleeve cuff 20. If the sleeve placket 22 begins to pucker, a part of the cuff 20 will be pulled towards the sleeve 18, resulting in an unseemly shirt sleeve cuff 20. As such, for maximum prevention of pucker it is desirable to have the adhesive of the bonding strip 38 flow over the entire surface of the seam 24. This will ensure complete bonding of the surface of the first garment component 26.

Although in the preferred embodiment the bonding strip 38 consists of an adhesive web as described above, other elements are contemplated. In an alternative embodiment the bonding strip 38 consists of an interlining having an adhesive coating on its outer surfaces. Interlinings are known in the art to provide stiffness to garment components. For example, interlinings are used in shirt collars and center plackets to provide a degree of stiffness. However, the interlining of the present invention utilizes an adhesive on its outer surfaces and is specifically used for garment seams. More specifically, the interlining body of the present invention is preferably a woven interlining made from cotton or a polyester/cotton blend. Alternatively, a nonwoven interlining body made from polyester, nylon, viscose or blends of these materials may also be used. Preferably, the interlining body is fabricated from a single material so as to avoid the high cost associated with producing composite interlining. The interlinings have a coating of an adhesive on an upper and lower surface. The adhesive is preferably one of the same thermal adhesives previously mentioned in the adhesive web embodiment discussed above. The adhesive may be applied on the upper and lower surfaces of the interlining as an adhesive layer or as a series of adhesive dots. Significantly, a quantity of adhesive sufficient to flow over the garment surfaces as described above, is most desirable, in order to provide complete bonding as contemplated by the present invention. In certain instances, however, where less than complete binding is adequate, the extent of the adhesive may be reduced.

Although the specific embodiment, as shown in the Figures, is directed to a sleeve placket seam 24 of a dress shirt 10, it is to be understood that the seam 24 and method for production of the present invention can advantageously be utilized in a variety of garments, for example, in various seams of dress slacks.

SUMMARY OF MAJOR ADVANTAGES OF THE INVENTION

After reading and understanding the foregoing detailed description of an inventive garment seam and method for production in accordance with preferred embodiments of the invention, it will be appreciated that several distinct advantages of the subject garment seam and method for production are obtained.

Without attempting to set forth all of the desirable features of the instant garment seam and method for production, at least some of the major advantages include providing a pucker free garment sleeve placket seam comprising of a first garment component or a dress shirt sleeve placket; a second garment component or a dress shirt sleeve; and a bonding strip interposed within a reversely bent edge of the first garment component.

The use of the bonding strip provides a pucker free sleeve placket seam which has not been successfully accomplished by prior art attempts. Preferably, the bonding strip comprises an adhesive web which flows under heat and pressure onto abutting surfaces of the garment fabric to create a strong bond between the garment components along the garment seam. This bond prevents the surfaces of the first garment component from separating during subsequent laundering of the garment. Alternatively, the bonding strip consists of an interlining body having a thermal adhesive coating on its outer surface. The interlining body can be fabricated from a single material thus avoiding the use of a costly composite interlining body.

The sleeve placket garment seam and method for production of the present invention provides for a less costly alternative to other prior art attempts at eliminating seam pucker and without the need for substantial modification of current seam production operations.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A method for producing a smooth garment seam between a first garment component and a second garment component, said method comprising the steps of:
   (a) placing the first garment component having a first surface and a second surface in an adjacent relationship to the second garment component having a first surface and a second surface so as to define a seam;
   (b) placing a bonding strip having a first surface and a second surface and at least a thermal adhesive component along the seam such that the second surface of the bonding strip abuts the first surface of the first garment component;
   (c) reverse folding the first garment component over the bonding strip such that the first surface of the first garment component also abuts the first surface of the bonding strip;
   (d) reverse folding the first garment component a second time such that a portion of the first surface of the first garment component abuts itself;
   (e) reverse folding a portion of the first garment component a third time such that a portion of the second surface of the first garment component abuts the second surface of the second garment component along the seam, and a portion of the first surface of the first garment component abuts itself along the seam;
   (f) sewing the first and second garment components and the bonding strip together by a stitch running along the bonding strip; and
   (g) applying sufficient heat and pressure to said bonding strip to cause the thermal adhesive to melt such that said adhesive flows onto the first surface of the first garment component along the first surface of the bonding strip and concomitantly along the second surface of the bonding strip to provide a bond along the seam and around the stitch such that the bonded component will effectively reduce a tendency of the seam to exhibit pucker following laundering operations.

2. A method for producing a smooth garment seam between a first garment component and a second garment component as defined in claim 1 wherein:

said step of placing a bonding strip comprises placing an adhesive composed of a thermoplastic material.

3. A method for producing a smooth garment seam between a first garment component and a second garment component as defined in claim 2 wherein:

said step of placing a bonding strip comprises placing an adhesive composed of a thermoplastic material selected from the group consisting of polyamide, polyester, olefinic, polyurethane, and ethylene vinylacetate copolymer materials.

4. A method for producing a smooth garment seam between a first garment component and a second garment component as defined in claim 1 wherein:

said step of placing a bonding strip comprises placing a thermal adhesive having a melting point ranging from approximately 60 to 160 degrees celsius.

5. A method for producing a smooth garment seam between a first garment component and a second garment component as defined in claim 1 wherein:

said step of placing a bonding strip comprises placing a thermal adhesive net having a density of approximately 8 to 80 grams per square meter.

6. A method for producing a smooth garment seam between a first garment component and a second garment component as defined in claim 1 wherein:

said step of placing first and second garment components comprise placing a first garment component comprising a sleeve placket of a dress shirt and a second garment component comprising a sleeve of a dress shirt, such that said seam is the sleeve placket seam of a dress shirt.

7. A method for producing a smooth garment seam between a first garment component and a second garment component as defined in claim 1 wherein:

said step of placing first and second garment components comprise placing said garment components such that said seam comprises at least a sleeve placket seam of a dress shirt.

8. A method for producing a smooth garment seam between a first garment component and second garment component as defined in claim 1 wherein:

the step of applying heat and pressure comprises ironing and pressing.

9. A method for producing a smooth garment seam between a first garment component and a second garment component as defined in claim 8 wherein:

the step of applying an ironing and pressing process comprises carrying out the process at a temperature of between 60 and 160 degrees celsius for 5 to 10 seconds.

10. A method for producing a smooth garment seam between a first garment component and a second garment component as defined in claim 1 wherein:

said step of placing a bonding strip comprises placing between the reverse folded first surface of the first garment component a thermal adhesive web or net composed entirely of a thermal adhesive.

11. A method for producing a smooth garment seam between a first garment component and second garment component as defined in claim 10 wherein:

said step of placing a bonding strip comprises placing a thermal adhesive web composed of a plurality of adhesive filaments having a diameter ranging approximately between 20 to 80 microns.

12. A method for producing a smooth garment seam between a first garment component and a second garment component as defined in claim 10 wherein:

said step of placing a bonding strip comprises placing a thermal adhesive web having a density of approximately 10 to 100 grams per square meter.

13. A method for producing a smooth garment seam between a first garment component and a second garment component as defined in claim 1 wherein:

said step of placing a bonding strip comprises placing an interlining having a quantity of thermal adhesive on upper and lower surfaces thereof.

14. A method for producing a smooth garment seam between a first garment component and a second garment component as defined in claim 13 wherein:

said step of placing a bonding strip comprises placing a woven interlining fabricated from cotton.

15. A method for producing a smooth garment seam between a first garment component and a second garment component as defined in claim 13 wherein:

said step of placing a bonding strip comprises placing a woven interlining fabricated from a polyester/cotton blend.

16. A method for producing a smooth garment seam between a first garment component and a second garment component as defined in claim 13 wherein:

said step of placing a bonding strip comprises placing a nonwoven interlining fabricated from a material selected from the group consisting of polyester, nylon, and viscose and blends thereof.

17. A method for producing a smooth garment seam between a first garment component and a second garment component as defined in claim 1 wherein:

said step of applying heat and pressure comprises applying said heat and pressure for at least 5 seconds.

18. A method for producing a smooth garment seam between a first garment component and a second garment component as defined in claim 1 wherein:

said step of sewing comprises sewing through the reverse folded portions of the first garment component, the bonding strip, and the second garment component.

19. A method of producing a smooth garment seam between first and second garment components as defined in claim 1 wherein:

said step of placing a bonding strip comprises placing a generally rectangular strip positioned between the reverse folded first surface of the first garment component without forming a fold in the generally rectangular bonding strip.

20. In a clothing garment having between a first garment component and a second garment component, a smooth seam comprising:

a bonding strip having at least a thermal adhesive component and having an upper and lower surface;

a first garment component having a first and second surface, the first garment component being reverse folded around the bonding strip such that a portion of the first surface of the first garment component is bonded to said lower surface of the bonding strip and the first surface of the first garment component is also bonded to said upper surface of the bonding strip;

the first garment component being reverse folded a second time such that a portion of the first surface of the first garment component abuts itself;

the first garment component being reverse folded a third time such that a portion of the second surface of the first garment component abuts a second surface of the second garment component along the seam, and a portion of the first surface of the first garment component abuts itself along the seam; and a stitch running along the seam sewing the first and second garment components and the bonding strip together and wherein bonding the seam comprises subjecting the seam to a sufficient amount of heat and pressure to cause the thermal adhesive to bond the first garment component along the upper surface of said bonding strip and concomitantly along the lower surface of said bonding strip such that a bond is formed by the bonding strip along the seam to reduce a tendency to pucker following laundering.

21. In a clothing garment having between a first garment component and a second garment component, a smooth seam as defined in claim 20 wherein:

said adhesive is composed of a thermoplastic material.

22. In a clothing garment having between a first garment component and a second garment component, a smooth seam as defined in claim 21 wherein:

said adhesive is composed of a thermoplastic material selected from the group consisting of polyamide, polyester, olefinic, polyurethane, and ethylene vinylacetate copolymer materials.

23. In a clothing garment having between a first garment component and a second garment component, a smooth seam as defined in claim 20 wherein:

said thermal adhesive has a melting point ranging from approximately 60 to 160 degrees celsius.

24. In a clothing garment having between a first garment component and a second garment component a smooth seam as defined in claim 20 wherein:

said bonding strip is a thermal adhesive net having a density of approximately 8 to 80 grams per square meter.

25. In a clothing garment having between a first garment component and a second garment component, a smooth seam as defined in claim 20 wherein:

said first garment component comprises a sleeve placket of a dress shirt; and said second garment component comprises a sleeve of a dress shirt.

26. In a clothing garment having between a first garment component and a second garment component, a smooth seam as defined in claim 20 wherein:

said seam comprises the sleeve placket seam of a dress shirt.

27. In a clothing garment having between a first garment component and a second garment component, a smooth seam as defined in claim 20 wherein:

said heat and pressure are accomplished by an ironing and pressing process.

28. In a clothing garment having between a first garment component and a second garment component, a smooth seam as defined in claim 27 wherein:

the ironing and pressing process is carried out at a temperature up to between 60 to 160 degrees celsius for 5 to 10 seconds.

29. In a clothing garment having between a first garment component and a second garment component, a smooth seam as defined in claim 20 wherein:

said bonding strip is a thermal adhesive web composed entirely of a thermal adhesive.

30. In a clothing garment having between a first garment component and a second garment component, a smooth seam as defined in claim 29 wherein:

said thermal adhesive web is composed of a plurality of adhesive filaments having a diameter ranging approximately between 20 to 80 microns.

31. In a clothing garment having between a first garment component and a second garment component, a smooth seam as defined in claim 29 wherein:

said thermal adhesive web has a density of approximately 10 to 100 grams per square meter.

32. In a clothing garment having between a first garment component and a second garment component, a smooth seam as defined in claim 20 wherein:

said bonding strip comprises an interlining having on first and second surfaces a quantity of thermal adhesive.

33. In a clothing garment having between a first garment component and a second garment component, a smooth seam as defined in claim 32 wherein:

said interlining is a woven interlining fabricated from cotton.

34. In a clothing garment having between a first garment component and a second garment component, a smooth seam as defined in claim 32 wherein:

said interlining is a woven interlining fabricated from a polyester/cotton blend.

35. In a clothing garment having between a first garment component and a second garment component, a smooth seam as defined in claim 32 wherein;

said interlining comprises a nonwoven interlining fabricated from a material selected from the group consisting of polyester, nylon, and viscose and blends thereof.

36. In a clothing garment having between a first garment component and a second garment component, a smooth seam as defined in claim 20 wherein:

said heat and pressure are applied for at least 5 seconds.

37. In a clothing garment having between a first garment component and a second garment component, a smooth seam as defined in claim 20 wherein:

said bonding strip comprises a generally rectangular strip positioned between reverse folded first surface of the first garment component without forming a fold in the rectangular bonding strip.

38. In a clothing garment having between a first garment component and a second garment component, a smooth seam as defined in claim 20 wherein:

said stitch traverses through the reverse folded portions of the first garment component, the bonding strip, and the second garment component.

39. A method for producing a pucker free garment seam joining a first garment component forming a sleeve placket of a shirt and a second garment component forming a sleeve of the shirt, said method comprising the steps:

(a) providing the first garment component forming a sleeve placket of a shirt and having a first and a second surface;

(b) providing the second garment component forming the sleeve of the shirt and having a first and a second surface;

(c) providing a bonding strip having a first and a second surface and at least a thermal adhesive component and placing the bonding strip along the seam formed by positioning the first garment component and the second garment component such that the second surface of the bonding strip contacts the first surface of the first garment component along the seam;

(d) reverse folding the first garment component over the bonding strip such that the first surface of the first garment component is folded over and abuts a first surface of the bonding strip along the seam;

(e) reverse folding the first garment component a second time such that a portion of the first surface of the first garment component abuts itself;

(f) reverse folding the first garment component a third time such that a portion of the second surface of the first garment component abuts the second surface of the second garment component along the seam, and a portion of the first surface of the first garment component abuts itself along the seam;

(g) sewing a stitch along the seam such that it traverses through at least the first and third reverse folded portions of the first garment component, the bonding strip and the second garment component; and (h) applying sufficient heat and pressure to the bonding strip to cause the thermal adhesive to melt such that the adhesive flows onto the first surface of the first garment component along the second surface of the bonding strip and concomitantly along the first surface of the bonding strip to provide a bond along the seam such that the bonding component will effectively reduce a tendency of the seam to exhibit pucker following laundering operations.

40. A method for producing a pucker free garment seam joining a first garment component forming a sleeve placket of a shirt and a second garment component forming a sleeve of the shirt as defined in claim 39 wherein:

said step of placing a bonding strip comprises placing an adhesive composed of a thermoplastic material.

41. A method for producing a pucker free garment seam joining a first garment component forming a sleeve placket of a shirt and a second garment component forming a sleeve of the shirt as defined in claim 39 wherein:

said step of placing a bonding strip comprises placing a thermal adhesive having a melting point ranging from approximately 60 to 160 degrees Celsius.

42. A method for producing a pucker free garment seam joining a first garment component forming a sleeve placket of a shirt and a second garment component forming a sleeve of the shirt as defined in claim 39 wherein:

said step of placing a bonding strip comprises placing a thermal adhesive net having a density of approximately 8 to 80 grams per square meter.

43. A method for producing a pucker free garment seam joining a first garment component forming a sleeve placket of a shirt and a second garment component forming a sleeve of the shirt as defined in claim 39 wherein:

the step of applying heat and pressure comprise the step of ironing and pressing at a temperature up to 160 degrees celsius for 5 to 10 seconds.

44. A method for producing a pucker free garment seam joining a first garment component forming a sleeve placket of a shirt and a second garment component forming a sleeve of the shirt as defined in claim 39 wherein:

said step of placing a bonding strip comprises placing between the reverse folded first surface of the first garment component a thermal adhesive web or net composed entirely of a thermal adhesive.

45. A method for producing a pucker free garment seam joining a first garment component forming a sleeve placket of a shirt and a second garment component forming a sleeve of the shirt as defined in claim 44 wherein:

said step of placing a bonding strip comprises placing a thermal adhesive web composed of a plurality of adhesive filaments having a diameter ranging approximately between 20 to 80 microns.

46. A method for producing a pucker free garment seam joining a first garment component forming a sleeve placket of a shirt and a second garment component forming a sleeve of the shirt as defined in claim 39 wherein:

said step of placing a bonding strip comprises placing an interlining having a quantity of thermal adhesive on the first and second surfaces.

47. A method for producing a pucker free garment seam joining a first garment component forming a sleeve placket of a shirt and a second garment component forming a sleeve of the shirt as defined in claim 39 wherein:

said step of sewing comprises sewing through the reverse folded portions of the first garment component, the bonding strip, and the second garment component.

48. A method for producing a pucker free garment seam joining a first garment component forming a sleeve placket of a shirt and a second garment component forming a sleeve of the shirt as defined in claim 39 wherein:

said step of placing a bonding strip comprises placing a generally rectangular strip positioned between the reverse folded first surface of the first garment component without forming a fold in the generally rectangular strip.

49. In a shirt having a sleeve placket component and a sleeve component forming a pucker free seam, said pucker free seam comprising:

a bonding strip having at least a thermal adhesive component and having a first and a second surface;

a first garment component forming the sleeve placket of a shirt having a first surface, reverse folded over the bonding strip such that a portion of the first surface of the first garment component is bonded to the second surface of the bonding strip and the first surface of the first garment component is also bonded to the first surface of the bonding strip;

the first garment component being folded a second time such that a portion of the first surface of the first garment component abuts itself;

a second garment component forming a sleeve of the shirt having a first and second surface;

the first garment component being reverse folded a third time such that a portion of the second surface of the first garment component abuts the second surface of the second garment component along the seam, and a portion of the first surface of the first garment component abuts itself along the seam;

a stitch extending along the seam and traversing through at least the first and third reverse folded portions of the first garment component, the bonding strip, and the second garment component; and the bonding strip of the seam being subjected to a sufficient amount of heat and pressure to cause the thermal adhesive to bond at its second surface to the first surface of the first garment component and concomitantly at the first surface of the bonding strip to the first surface of the once reverse folded portion of the first garment component such that the bonded component will effectively reduce a tendency of the seam to exhibit pucker following laundering operations.

50. In a shirt having a sleeve placket component and a sleeve component forming a pucker free seam as defined in claim 49 wherein:

said adhesive is composed of a thermoplastic material.

51. In a shirt having a sleeve placket component and a sleeve component forming a pucker free seam as defined in claim 49 wherein:

said thermal adhesive has a melting point ranging from approximately 60 to 160 degrees celsius.

52. In a shirt having a sleeve placket component and a sleeve component forming a pucker free seam as defined in claim 49 wherein:

said bonding strip is a thermal adhesive net having a density of approximately 8 to 80 grams per square meter.

53. In a shirt having a sleeve placket component and a sleeve component forming a pucker free seam as defined in claim 49 wherein:

the heat and pressure process is carried out by ironing and pressing at a temperature up to 160 degrees celsius for 5 to 10 seconds.

54. In a shirt having a sleeve placket component and a sleeve component forming a pucker free seam as defined in claim 49 wherein:

said bonding strip is a thermal adhesive web composed entirely of a thermal adhesive.

55. In a shirt having a sleeve placket component and a sleeve component forming a pucker free seam as defined in claim 54 wherein:

said thermal adhesive web is composed of a plurality of adhesive filaments having a diameter ranging approximately between 20 to 80 microns.

56. In a shirt having a sleeve placket component and a sleeve component forming a pucker free seam as defined in claim 49 wherein:

said bonding strip comprises an interlining having on first and second surfaces a quantity of thermal adhesive.

57. In a shirt having a sleeve placket component and a sleeve component forming a pucker free seam as defined in claim 49 wherein:

said stitch traverses through the reverse folded portions of the first garment component, the bonding strip, and the second garment component.

58. In a shirt having a sleeve placket component and a sleeve component forming a pucker free seam as defined in claim 49 wherein:

said bonding strip is a generally rectangular strip positioned between the reverse folded first surface of the first garment component without forming a fold in the rectangular strip.

* * * * *

Disclaimer

5,775,394—John Wong, Montreal, Canada. PUCKER FREE SLEEVE PLACKET GARMENT SEAM AND METHOD FOR PRODUCTION. Patent dated July 7, 1998. Disclaimer filed Mar. 01, 2006, by the Assignee, Tal Apparel, Ltd.

The term of this patent, subsequent to the term of patent numbers, 5,568,779, 5,590,615, 5,713,292, 5,782,191, 5,950,554, 6,070,542 and 6,079,343 has been disclaimed.

*(Official Gazette, June 27, 2006)*